(12) United States Patent
Crespo Barrio

(10) Patent No.: US 6,360,655 B1
(45) Date of Patent: Mar. 26, 2002

(54) PROCESS AND MACHINE FOR THE TREATMENT OF RESIDUES

(76) Inventor: Jose Francisco Crespo Barrio, San Francisco, 57-1 #20, 36202 Vigo (ES)

(*) Notice: Subject to any disclaimer, the term of this patent is extended or adjusted under 35 U.S.C. 154(b) by 0 days.

(21) Appl. No.: 09/445,487
(22) PCT Filed: Jun. 18, 1998
(86) PCT No.: PCT/ES98/00173
  § 371 Date: Dec. 7, 1999
  § 102(e) Date: Dec. 7, 1999
(87) PCT Pub. No.: WO98/57800
  PCT Pub. Date: Dec. 23, 1998

(30) Foreign Application Priority Data

Jun. 18, 1997 (ES) .............................. 9701322

(51) Int. Cl.[7] .............................. B30B 9/02; B30B 1/00
(52) U.S. Cl. .............................. 100/37; 100/73; 100/92; 100/110; 100/112; 100/179; 100/183; 100/190; 100/209; 100/218; 100/226; 100/232
(58) Field of Search .............................. 100/37, 73, 74, 100/77, 90, 92, 110, 112, 179, 183, 190, 209, 215, 218, 226, 232, 302

(56) References Cited

U.S. PATENT DOCUMENTS

| | | | |
|---|---|---|---|
| 5,203,261 A | * 4/1993 | Davis | 100/232 |
| 5,207,994 A | * 5/1993 | Suzuki et al. | 100/232 |
| 5,322,009 A | * 6/1994 | Retrum | 100/232 |
| 5,347,921 A | * 9/1994 | Gourdol | 100/232 |
| 5,398,838 A | * 3/1995 | Dosunmu | 220/524 |
| 5,558,014 A | * 9/1996 | Robinson | 100/232 |

FOREIGN PATENT DOCUMENTS

| | | | |
|---|---|---|---|
| EP | 0105862 A1 | * | 4/1984 |
| FR | 2644373 A1 | * | 9/1990 |
| FR | 2698023 A1 | * | 5/1994 |
| WO | WO 97/23346 | * | 7/1997 |

* cited by examiner

*Primary Examiner*—Peter Vo
*Assistant Examiner*—Louis Huynh
(74) *Attorney, Agent, or Firm*—Klauber & Jackson

(57) ABSTRACT

Residues are found to be stored in the compartments of a multiple container, located in homes, restaurants, cafeterias, etc. The residues thus classified are treated by the user himself who places the residues of the same type in the machine object of the invention, which will be another electrical appliance in homes and premises. The process consists of compacting each type of residue, forming briquettes with a spherical, cylindrical, prismatic shape, etc. formed in the compacting chamber of the machine. A binding material, such as a resin or the like and simultaneously a dye that indicates in accordance with a color code, the type of residue of the briquette, are injected on the briquette in a final stage. After polymerization and solidification, the briquettes are diverted automatically to a storage chamber for their subsequent transfer. The machine includes a compacting chamber with a side wall and another top wall movable by means of respective hydraulic cylinders. The bottom has a movable plate with through holes for juices, also having washing showers. There are binder and dye injecting nozzles, as well as cylinders for diverting the formed briquettes.

7 Claims, 5 Drawing Sheets

PROCESS AND MACHINE FOR THE TREATMENT OF RESIDUES

OBJECT OF THE INVENTION

The present invention comprises a machine for the treatment of residues by means of compaction or solidification by means of a color coded binder in accordance with the type of residue. In other words, a new process and suitable machine are combined to carry out the process, which may be for domestic or industrial use.

Due to the fact that the XXI century will be the century concerned with the environment, and that it is not possible to maintain the rate of destruction of the ecosystem in order to produce raw materials, nor is it possible to incinerate all residues due to the contamination this would produce, it is necessary TO REDUCE RESIDUES, TO REUSE RESIDUES AND TO RECYCLE RESIDUES.

The process that is going to be described and the appropriate machine for this purpose, are based on a totally innovative concept and it proves to be very advantageous in many senses, given that it allows RESIDUES TO BE REDUCED, REUSED AND RECYCLED. The process is easy to use and also causes a reduction of containers on thoroughfares and in the service cost for the government.

BACKGROUND OF THE INVENTION

As background and without trying to make an exhaustive list of all possible residues and concentrating on urban residues as an example for the description of the application of this new process and machine, we can state the following background:

Nowadays urban residues tend to be placed by users or people who produce residues, in containers or vessels generally owned by the city government. These residues, after they are picked up by the corresponding garbage collectors, may have two destinations:

Destruction or incineration (traditional garbage dumps)

Transfer to so-called "transfer" plants. These plants may have two basic activities:

Compacting residues and packing them for their subsequent transfer to a residue incinerator.

Collecting mixed residues and trying to select the residues usable for subsequent reuse or recycling and the non-usable ones compacting them for their subsequent destruction in an incinerating plant, or in a controlled dump.

Presently there is also a tendency to request the collaboration of citizens to make a previous selection of residues, in such a way that they may be treated more easily in the plants of destination, or even so that they may be recycled, such as in the case of specific containers for paper, glass, batteries, cans, etc.

This collaboration becomes difficult because it has to combine ease for the user, so that it is effective, the availability on thoroughfares and the cost that the Government may assume. Among machines for the treatment of residues, ES-2101661 has special interest since it discloses a machine for compacting and packing residues. Said machine comprises an equipment for compacting residues provided with a pressing head and a collector recipient, as well as an equipment for packing the compacted residues and for closing hermetically said packing, means for collecting liquid residues and means for cleaning and disinfecting the equipment for compacting.

DESCRIPTION OF THE INVENTION

In broad outline, the process for the treatment of residues, that comprises the object of the invention, as well as the machine whereby said process is carried out, are based on a new concept which comes from the idea that the entire process of selection and compaction of residues is done by user himself, at the place where the residues are produced and using for this purpose the machine which will be like another electrical appliance in homes, restaurants, cafeterias, etc.

In this way countless advantages are obtained, since the residues leave the place of production already prepared, without producing bad smells for users or on thoroughfares, preventing pollution by residue putrefaction, being easily storable by users as well as of the new containers on thoroughfares, reducing up to one-fourth the volume of residues and allowing selective garbage collection, which would involve a drastic reduction of all costs of the municipal services or of the government, and in general of the entire residue collection process and subsequent treatment thereof.

As it has already been indicated above, residue selection is done by the person himself who produces the same, that is to say, it is done in the home of the user himself, in bars, restaurants, industry, etc. For this purpose, a multiple container, with various individual vessels or ones separated by partitions, is used, in such a way that the residues may be deposited selectively; for example, paper, glass, cans, organic residues, plastic, TETRABRIK™, etc.

Subsequently, as the vessels of the container become filled, with the already classified residues, they are emptied into the tank of the machine that will be described hereinafter and that comprises the object of the present invention, for treatment thereof according to the type of deposited residue.

The machine is comprised of a loading tank wherein the pre-selected residues are deposited. For this purpose it has a cover in the top part, through which the residues are inserted and it is closed during the process.

One of the side walls of this tank is formed by an attack plate or surface of a horizontal cylinder that advances pressing the contents of the tank and thus producing the first pressing of the residues horizontally.

Afterwards, another smaller plate cylinder that operates vertically, produces a second pressing so that the residues remain converted into a compact and dehydrated briquette, in the event that the residues had any liquid or were wet.

For this purpose, the base of the tank is provided with holes that communicate with a collector and its corresponding drain in order to evacuate the liquids that may be produced during the successive pressings. Said collector has some showers connected to a water tank and another disinfectant tank for cleaning and periodic disinfecting of the surface thereof, as well as of the tank.

A hand selector has also been provided for in order to choose the operating pressure of the cylinders in terms of the type of residues to be treated.

The briquette thus formed is diverted by means of the action of the vertical cylinder itself, towards a bottom chamber, which takes place once the bottom of the tank that is materialized by a movable plate, has been moved by means of the action of another cylinder, in order to allow the briquette to come out. This chamber is provided with heating means, generally resistors that are automatically connected when the briquette enters the chamber.

A binder, which may be of any type of resin or any other suitable binder, is injected onto the briquette in this heating chamber, through some injection channels and simultaneously a dye is injected, in such a way that the binder and the dye combine. The dye is of a different color depending on the type of residue, in accordance with a previously established color code.

Once the binder and the dye have covered the entire surface of the briquette, the heating means are disconnected in order to allow polymerization and solidification thereof.

The binder as well as the different dyes are contained in some suitable tanks, placed in the body of the machine, taking advantage of unused hollow spaces.

Then, the cylinder withdraws, making the movable plate retract in order to place it in its initial position, that is to say, placing again under the loading tank, the collector and the heating chamber, over the opening for ejection of the briquettes. Each one of the briquettes is pushed by one or several chambers, that operate vertically, producing their fall by gravity to a storage chamber provided for in the base of the machine, from where they will be removed at the opportune moment so as to be subsequently transferred to some collective selective residue containers, which upon the residue briquette being color coded, will allow storage thereof inside the public container in a classified manner, making it possible to maintain this pre-classification in the rest of the chain with the advantages that this involves.

The color coded collective residue containers, as well as the conveyance that intervenes up to the transfer plants, may include classified storage, equipping the corresponding spaces inside the container or inside the conveyor tank.

All of the movements are preferably of electric or hydraulic drive, although they may indistinctly be of pneumatic or mechanical drive.

Likewise, all the movements are perfectly synchronized in accordance with a programmed sequence, for which there are controls, meters, sensors, etc. and their corresponding control panel.

There are also doors for access to the inside for the cleaning and maintenance of the different mechanisms.

The fact that the thrust plates of the different cylinders, with which the pressing chamber is closed, may take on different surface shapes in order to also act as a mold for the briquettes, so that different shapes spherical, cylindrical, prismatic, etc., although the rectangular parallelepiped shape has been advantageously preferred because it is the simplest and most easily stackable for storage of briquette, may be conveniently obtained, should also be pointed out.

As one can see, the process set forth has countless advantages within the chain of production, collection and treatment of residues, contributing to improve the present day processes and systems that intervene in the elimination and recycling of residues.

This arrangement achieves a series of advantages, among which we can cite the following:

It reduces residues up to 25% of the present volume, in places of residue production, and therefore on thoroughfares or places used for this purpose.

The machine is totally hygienic, given that the binder forms an insulating and waterproof layer, avoiding wetness, smells and pollution, as the residues do not contact with oxygen that starts the putrefaction process. Likewise, the liquids in their initial, non-polluting state, are neutralized in their expulsion path through the drain, avoiding their chemical alteration and subsequent pollution.

The selective color coded collection allows briquettes of different types of residues to be grouped together, permitting in a simple and low cost manner, the reuse and recycling of residues.

It is very ecological, given that it will reduce emissions to the atmosphere coming from incinerating plants and smells coming from composting plants. It will reduce the problems of sealing dumps and the problems derived from gases in the same.

It allows effective and efficient residue management.

It permits the normalization of the residue management policy given that the different present-day social, economic, political factors, etc. are causing a lack of a uniform environmental policy.

Reduction of the high present costs in the residue collection and treatment chain.

It allows for users 'awareness and permits their cooperation in collective responsibility of the environment.

To provide a better understanding of the features of the invention and forming an integral part of this specification, some sheets of drawings in whose figures with an illustrative and non-restrictive manner, the following has been represented, are attached hereto:

DESCRIPTION OF THE PREFERRED EMBODIMENT

Making reference to the numbering used in the figures, we can see how the process for the treatment of residues, which the invention proposes, may be carried out in a machine whose structural and functional characteristics we can see outlined in the different drawings. As we have said above, the residues are classified in a multiple container which is not represented in the figures. Subsequently they are emptied into the tank of the machine for the treatment of residues which is described hereinafter.

Figure 1:
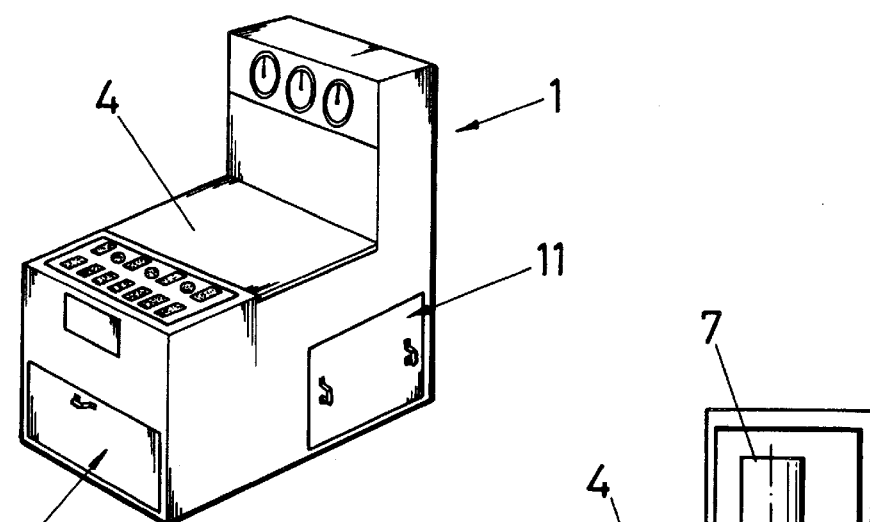
FIG. 1 is a general schematic view of the machine for the treatment of residues, object of the invention.
Figure 2:
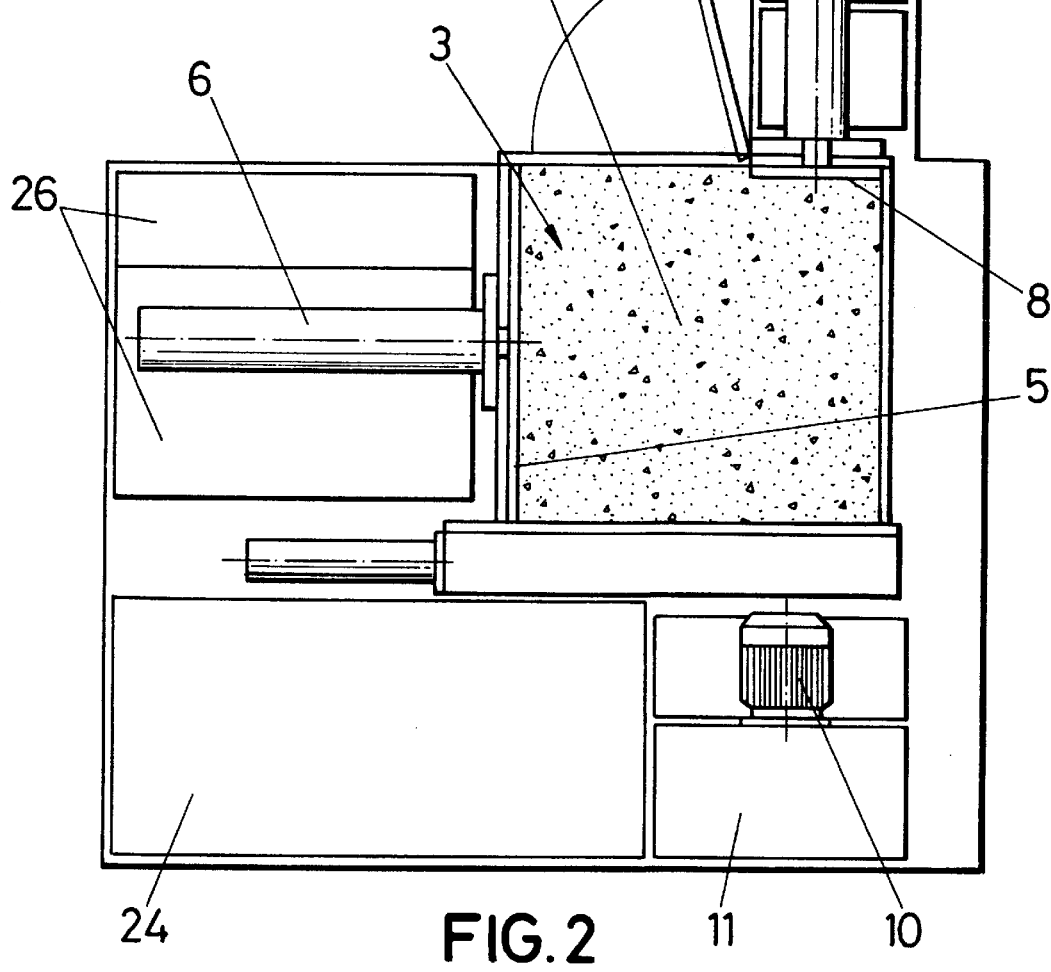
FIG. 2 is a schematic raised side view of the same machine.

This machine is generally referred to as number (1) and the tank or chamber where the residues (2) are introduced is referred to as number (3). In FIG. 2, the volume occupied by the residues (2) coincides with that of the chamber (3). Reference (4) designates the loading cover of the compacting chamber, which is to be kept closed while the machine is operating.

Figure 5:
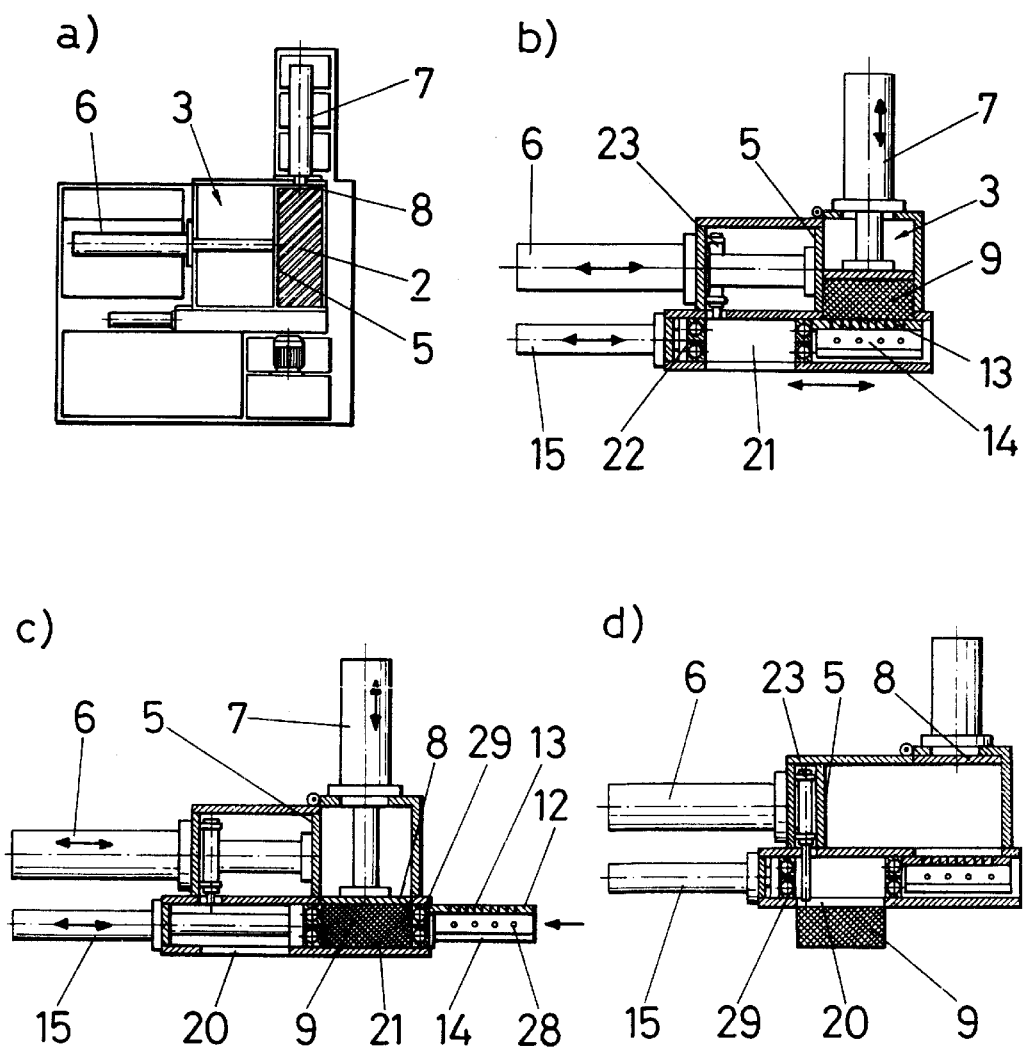
FIGS. 5a–d show a series of schematic views with respective operating sequences.

The wall of the chamber or tank (3) is formed by a plate (5) connected to the horizontal chamber (6), with which the first pressing stage is achieved (also see step a) of FIG. 5).

Reference (7) of this FIG. 2 designates the vertical hydraulic cylinder, to whose rod is integral the plate (8) with which the vertical compacting is achieved to form briquettes (9) (see FIG. 5).

Figure 3:
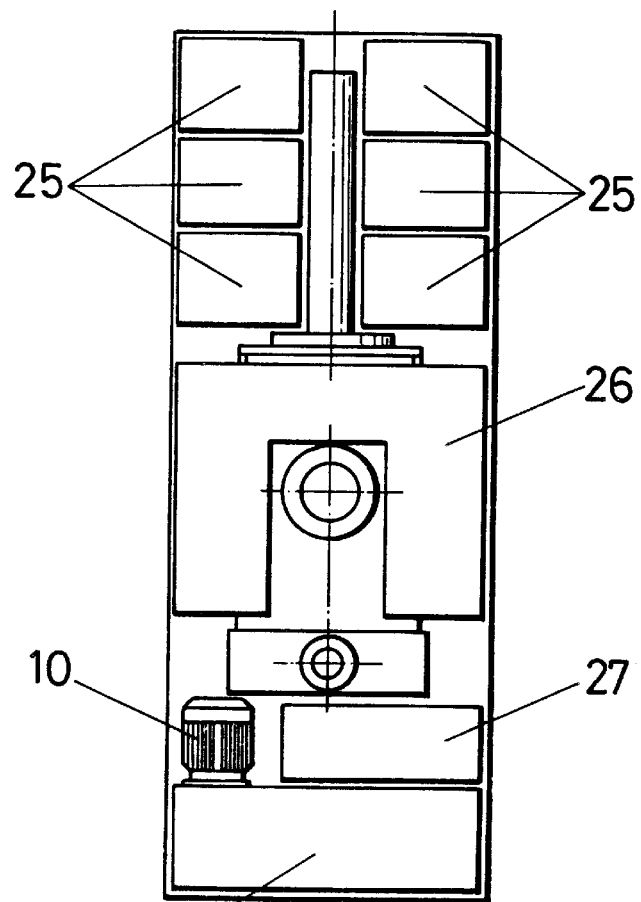
FIG. 3 is a side view of FIG. 2.

FIGS. 2 and 3 also show the electric motor (10) that puts into operation the pump of the hydraulic circuit driving the different cylinders. Reference (11) marks the location of the hydraulic plant.

Figure 9:
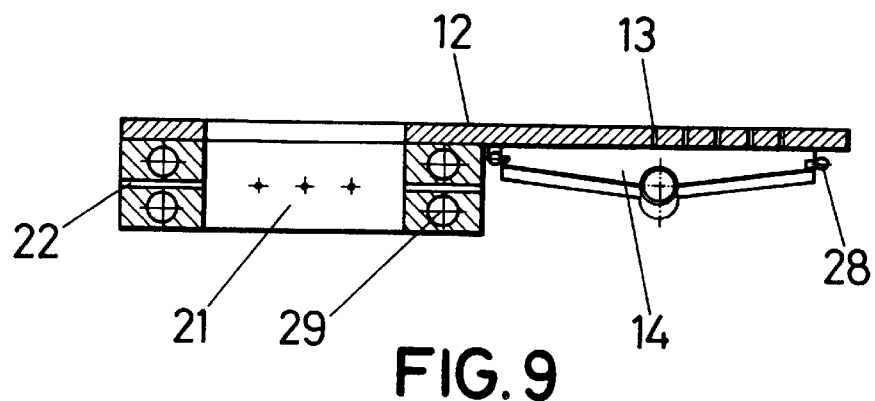
FIG. 9 is a raised longitudinal sectioned view of the movable plate.
Figure 10:
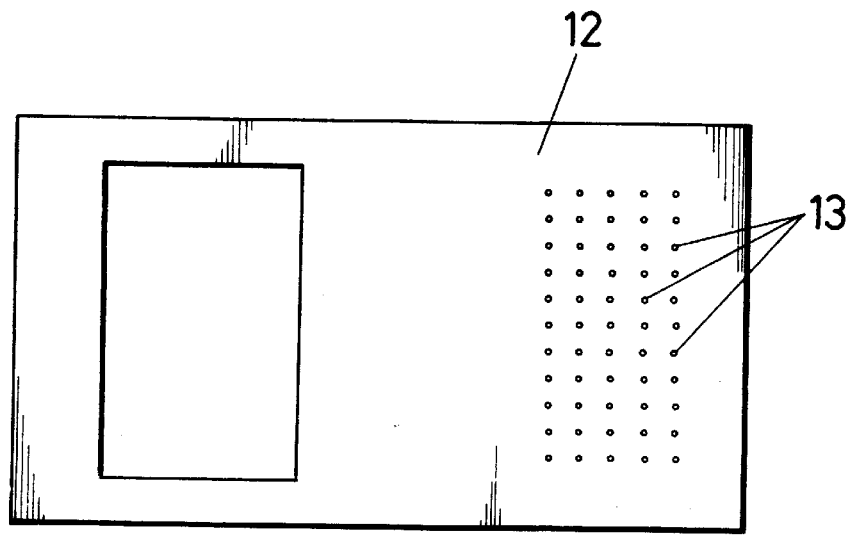
FIG. 10 is a top plan view of the same plate as in FIG. 9.
Figure 11:
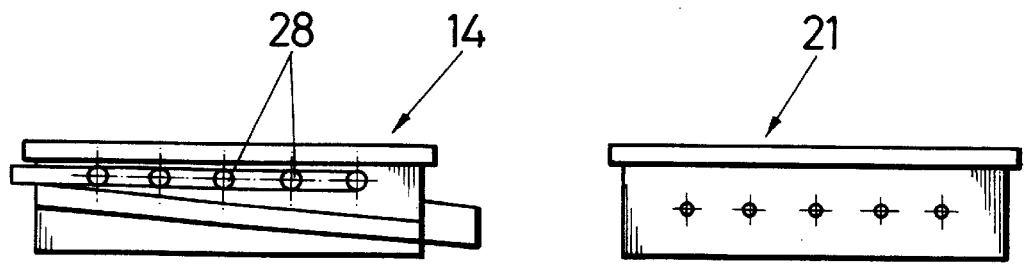
FIG. 11 is a raised side view of the liquid collector.
Figure 12:
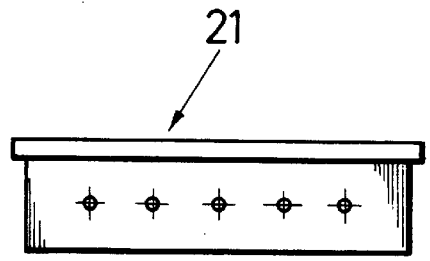
FIG. 12 is a raised view of the heating chamber for solidification of the briquettes.

The base of the tank of the compacting chamber (3) (FIG. 10) forms part of the movable plate (12) whose geometry is seen more clearly in FIG. 9. This movable plate includes in the top part, a series of through holes (13) of the liquids or juices that can be produced during the successive pressings, which are collected in the collector (14) (see FIGS. 5 and 6). In FIGS. 6 to 12 one can see how the movable plate (12) moves by the action of the hydraulic cylinder (15), duly guided between the top (16) and bottom (17) fixed plates. The top plate (16) has a front window (18) and a rear one (19), the dimensions of this window (18) being the ones that correspond to the vertical cylinder (7) plate (8) and the formed briquette (9) will pass through the window, as shown in sequences b) and c) of FIG. 5.

On its part, the bottom fixed plate (17) also has a window (20) in its rear part, for the exit of the briquette (9) towards the storage area, as shown in step d) of FIG. 5.

After the horizontal pressing (step a) of FIG. 5) and also the vertical pressing (step b) of FIG. 5) have taken place, the cylinder (15) driving the movable plate (12) pushes it moving it horizontally from its initial position (step c), in such a way that under the base of the tank (3) is located the chamber (21) contained in the movable plate (12), towards which is transferred the briquette (9) by means of the vertical thrust of the hydraulic cylinder (7), as is shown in step c) of FIG. 5. The heating means that automatically turn on when the briquette (9) enters into it, are found in this chamber (21). Reference (22) designates the channels for injection of the binder on the briquette (9), as well as of the dye that is combined with the binder.

The dye is of a different color, depending on the type of residues, according to a previously established color code.

Once the binder and the dye have coated the complete surface of the briquette, the heating means disconnect in order to facilitate polymerization and solidification thereof.

Finally, in step d) of FIG. 5, when the hydraulic cylinder (15) withdraws, making the movable plate (12) drawback to place it in its initial position, the heating chamber (21) locates itself over the ejection opening (20) of the formed briquette (9). Each one of these briquettes is pushed at the right moment, by one or several vertical action pushing elements (23), producing the fall thereof by gravity to a storage chamber (24) provided in the base of the machine (see FIG. 2).

If desired, the briquette (9) may pass from the tank or chamber (3) to the movable plate (2) by means of the thrust of the cylinder (7) itself, once the base of the movable plate has moved sideways, opening an outlet hole for the briquette thrust by the cylinder (7) itself in a second movement. Thus the briquette always follows a vertical path. Cylinders (15) and (23) are eliminated.

Figure 4:
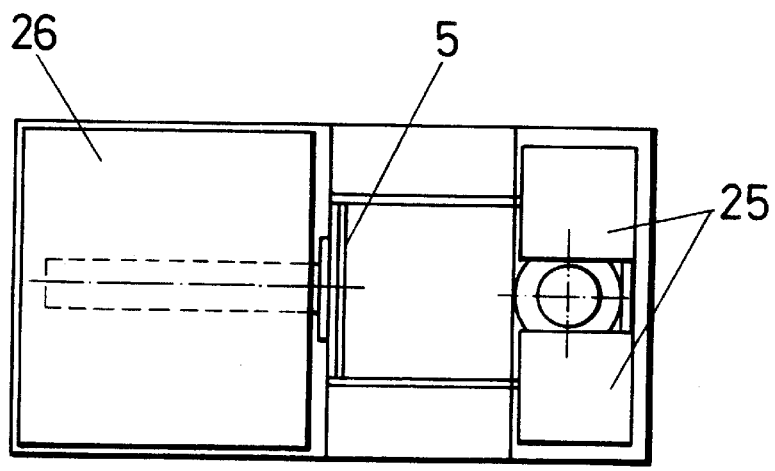
FIG. 4 is a plan view of what which has been shown in FIG. 2.

Making reference again to FIGS. 3 and 4, we can see the dye compartments referred to as number (25) and the binder compartments referred to as number (26). The disinfectant is located in compartment (27) of the machine.

We can see that the collector (14) linked to the movable plate (12) has mounted showers (28) connected to respective water and disinfectant tanks, for the periodic cleaning and disinfecting of the inside surface of the compacting chamber or tank (3).

Figure 6:
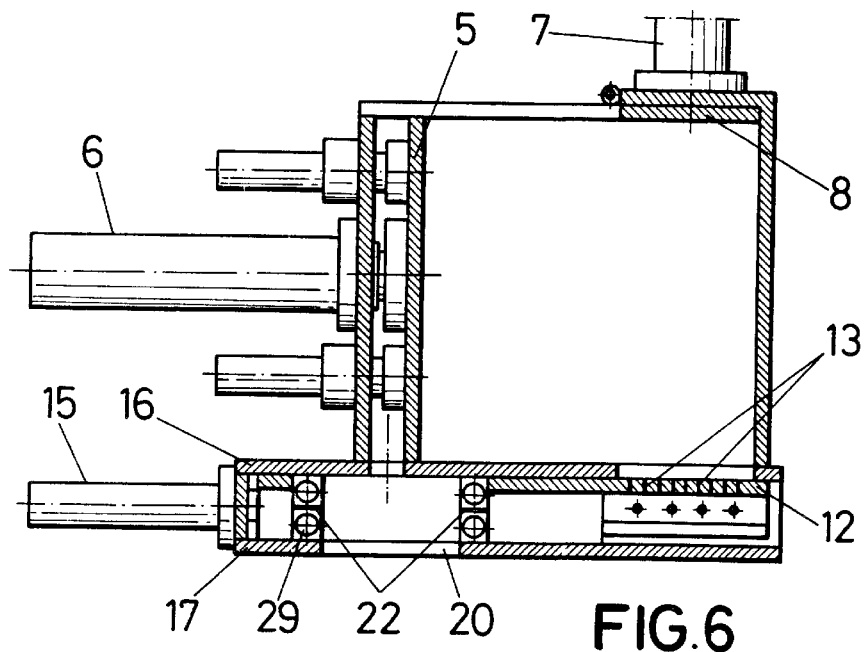
FIG. 6 is a raised longitudinal section of the same machine for the treatment of residues and particularly of the section related to the compacting chamber.
Figure 7:
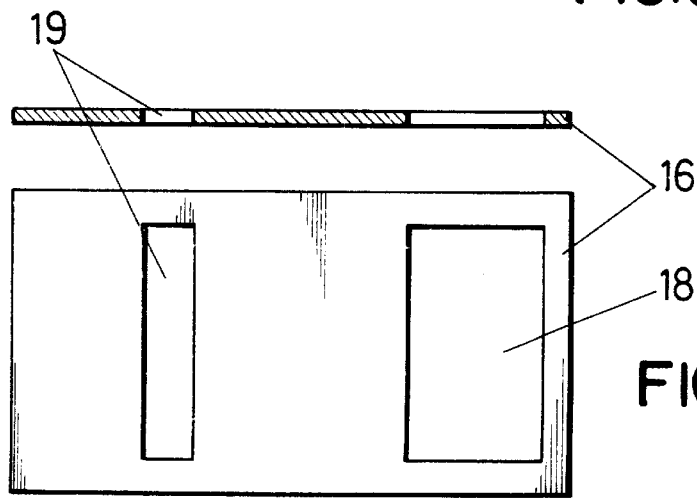
FIG. 7 is a plan longitudinal section of the top fixed plate, under which the movable plate slides.
Figure 8:
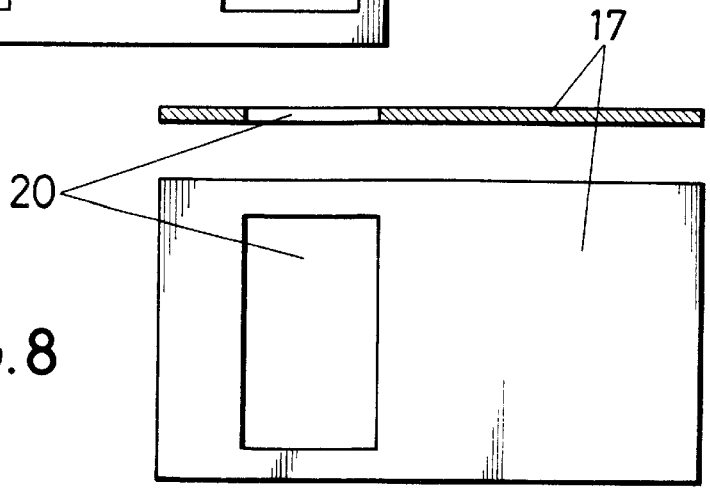
FIG. 8 is a plan longitudinal section of the bottom plate, above which the movable plate moves.

Reference (29) of FIG. 9 designates the heating resistors of the chamber (21), it also being possible to see these resistors in FIGS. 5 and 6.

What is claimed is:

1. A process for treatment of residues, by means of compacting and solidifying by means of a color coded binder in accordance with types of residues, through a machine provided with a compacting chamber in which residues previously selected by a user are introduced, stored and classified by type of residue in a multiple container that forms a body separated from said machine, said process comprising the steps of:

1) compacting separately the residues of each type to form briquettes equal in shape to the shape of the compacting chamber;

2) injecting a binder substance around the briquettes and simultaneously injecting a dye whose color adapts to a previously established color code for each type of residues;

3) polymerizing and solidifying the binder substance injected around the briquettes, and passing said briquettes to a storage chamber for subsequently transferring said briquettes classified by color to collective containers.

2. A machine for treatment of residues, in which previously classified residues placed in multiple containers by type of residue, are compacted and molded into briquettes, wherein said machine for treatment of residues, said machine comprising:

a compacting chamber in which said previously classified residues are deposited by means of a top opening provided with a cover in order to seal said opening;

a side wall belonging to said compacting chamber, being defined by a plate set substantially perpendicular to an end of a first cylinder disposed horizontally for accomplishing a first compression of the residues;

a second cylinder disposed vertically above the compacting chamber for accomplishing a second compression to transform said compressed residues into a compact and dehydrated briquette;

at least one hole located below the compacting chamber for evacuating liquid from said compressed residues;

a collector for collecting said liquid toward a drain;

a third cylinder disposed horizontally which pushes a movable plate disposed horizontally under the compacting chamber to make the briquette drop to a heating compartment linked to said movable plate;

heating means to heat a binder substance and a dye injected around the briquette;

an outlet of said heating compartment in front of which the briquette is placed by means of withdrawing the third cylinder which makes the movable plate be placed again under the compacting chamber; and, a pusher which diverts the briquette to a storage chamber.

3. The machine according to claim 2, wherein the collector is located under the movable plate, said movable plate being provided with at least one shower for ejecting water and disinfectant for periodic cleaning.

4. The machine according to claim 2, wherein hydraulic cylinders are of adjustable pressure depending on types of residues to be compacted.

5. The machine according to claim 2, wherein the binder substance and the dye completely cover the residues once compacted, to form a briquette after the binder substance and the dye have been polymerized and solidified, said dye having a predetermined color and shade to adapt to an established color code for each type of residues.

6. The machine according to claim 2, wherein the compacting chamber is provided with fixed side walls and movable side walls forming all together a cavity equal in shape to a predefined shape of the briquette.

7. The machine according to claim 2, wherein the binder substance and the dyes are contained in tanks located in said machine for treatment of residues.

* * * * *